United States Patent
Piazza et al.

(10) Patent No.: US 8,013,805 B2
(45) Date of Patent: Sep. 6, 2011

(54) AUTOMATIC ADJUSTMENT OF DISPLAY SETTINGS FOR REMOTE VIEWING BY AN ADMINISTRATOR

(75) Inventors: William Joseph Piazza, Holly Springs, NC (US); Edward Stanley Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1063 days.

(21) Appl. No.: 11/835,973

(22) Filed: Aug. 8, 2007

(65) Prior Publication Data

US 2009/0040135 A1 Feb. 12, 2009

(51) Int. Cl.
*G09G 5/00* (2006.01)
(52) U.S. Cl. ......... 345/1.1; 709/220; 709/221; 709/227; 709/228; 345/2.1; 345/2.2; 710/15; 710/16
(58) Field of Classification Search ............. 725/74–82; 345/1.1–1.3, 2.1–2.3, 3.1–3.4; 709/220–229; 710/15–18, 73
See application file for complete search history.

(56) References Cited

U.S. PATENT DOCUMENTS

| | | | |
|---|---|---|---|
| 7,024,046 | B2 | 4/2006 | Dekel et al. |
| 7,325,033 | B2 | 1/2008 | Thornton |
| 7,466,713 | B2 | 12/2008 | Saito |
| 2003/0191850 | A1 | 10/2003 | Thornton |
| 2003/0214458 | A1 | 11/2003 | Giemborek et al. |
| 2004/0015991 | A1 | 1/2004 | Thornton |
| 2004/0212610 | A1* | 10/2004 | Hamlin ............ 345/211 |
| 2005/0068252 | A1 | 3/2005 | Driver et al. |
| 2005/0237931 | A1 | 10/2005 | Punj et al. |
| 2005/0270296 | A1* | 12/2005 | Liu et al. ............ 345/501 |
| 2005/0289403 | A1* | 12/2005 | Rothman et al. ........ 714/56 |
| 2006/0106999 | A1 | 5/2006 | Baldwin et al. |
| 2006/0143262 | A1 | 6/2006 | Cromer et al. |
| 2006/0174217 | A1 | 8/2006 | Yan et al. |
| 2007/0016925 | A1 | 1/2007 | Vaysman et al. |
| 2007/0073776 | A1 | 3/2007 | Kalalian et al. |
| 2008/0068289 | A1* | 3/2008 | Piasecki ............ 345/2.1 |
| 2008/0079757 | A1* | 4/2008 | Hochmuth ............ 345/698 |

OTHER PUBLICATIONS

Farmer et al. "U.S. Appl. No. 11/958,652—System and Method for Real-Time Graphic Monitoring of Differing Graphics Resolutions Using a Single Graphics Buffer" filed Dec. 18, 2007, 41 pages.

Farmer et al. "Non-final Office Action, mailed Oct. 14, 2009 of U.S. Appl. No. 11/958,652" System and Method for Real-Time Graphic Monitoring of Differing Graphics Resolutions Using a Single Graphics Buffer, filed Dec. 18, 2007, 37 pages.

(Continued)

*Primary Examiner* — Lun-Yi Lao
*Assistant Examiner* — Gregory J Tryder
(74) *Attorney, Agent, or Firm* — Cynthia G. Seal; Jeffrey L. Streets

(57) ABSTRACT

A system and method automatically scale the resolution of video output of a selected workstation blade so that an administrator can view the video output by the selected workstation blade in the same format as it is displayed at the user terminal associated with the selected workstation blade. The video is automatically switched from a multi-screen display to a single-screen display for both the user and the administrator so that the administrator may see the video output regardless of differences between the displays the user and the administrator each have.

15 Claims, 2 Drawing Sheets

OTHER PUBLICATIONS

Farmer et al. "Amendment in response to Non-final Office Action, dated Oct. 14, 2009 of U.S. Appl. No. 11/958,652" System and Method for Real-Time Graphic Monitoring of Differing Graphics Resolutions Using a Single Graphics Buffer, 13 pages.

Farmer et al. "Final Office Action, mailed Apr. 15, 2010 of U.S. Appl. No. 11/958,652" System and Method for Real-Time Graphic Monitoring of Differing Graphics Resolutions Using a Single Graphics Buffer, filed Dec. 18, 2007, 37 pages.

* cited by examiner

AUTOMATIC ADJUSTMENT OF DISPLAY SETTINGS FOR REMOTE VIEWING BY AN ADMINISTRATOR

BACKGROUND OF THE INVENTION

1. Field of the Inventions

The present invention relates to displaying graphical output of clients in a client-server network, and to troubleshooting and maintaining the clients by an administrator.

2. Description of the Related Art

A "workstation blade" is a rack-mountable computer accessible over a network by a user from a remote user terminal networked to the workstation blade. A workstation blade is typically configured for use by a single user, replacing a local desktop computer workstation with a centrally located, rack-mountable computer. Computing resources such as the CPU, motherboard, hard drive, and videocards, reside on the workstation blade. The remote user terminal provides a familiar computing environment, including traditional peripherals, such as one or more user displays, a keyboard, and a mouse, even though these peripherals communicate over the Ethernet with the computing resources that are remotely located on the workstation blade. This consolidates computing resources for multiple users in a centralized location, allowing users to remotely interface with the centralized computing resources, while allowing a system administrator to more easily manage the computing resources. A system administrator terminal may be used to monitor applications of selected workstation blades over the network, such as to troubleshoot the workstation blade, install software, or perform other management tasks. The BLADECENTER product family from IBM includes some of the more compact chassis arrangements available on the market, and may be configured for use either with multi-user servers or with single-user workstation blades (IBM and BLADECENTER are registered trademarks of International Business Machines Corporation, Armonk, N.Y.). However, other rack-mountable workstation blade systems and their equivalents are available in the industry from a variety of manufacturers.

Workstation blades may be viewed in the context of client-server architecture, even though a server is often configured for use by multiple users and a workstation blade is typically configured for use by a single user. Client-server architecture is a computer network architecture wherein clients rely to some degree on the servers to which they are networked for processing. Each instance of the client software in a client-server network can send data requests to one or more connected servers. In turn, the servers can accept these requests, process them, and return the requested information to the client. As the concept of client-server architecture is applied to workstation blades, each instance of a workstation blade and associated user terminal form a client-server pair, wherein the workstation blade is on the server side and the user terminal is on the client side. The degree to which processing activities are performed on the server side of a client-server network varies among different systems and manufacturers. The term "thin client" (or "lean client") is sometimes used to describe a client that has little processing capabilities and relies heavily on its associated server for processing. A thin client may be as simple as a "dumb-terminal" that has no processing capabilities other than conveying input and output between the user and the server, relying extensively or entirely on the computing capabilities of the server to which it is networked. Other types of clients have more processing power, and can run complete operating systems, but may still lack other components usually available on standalone computers, such as media drives.

When monitoring the graphical output (i.e. video output) of a workstation blade, it is helpful for the administrator terminal to display the same thing that is being displayed on the remote user display by the workstation blade. Monitoring a selected workstation blade from an administrator workstation can be problematic, however, due to potential differences in display capabilities and formats between the administrator display and the numerous individual user displays being used at the client terminals. Most notably, it can be difficult or impossible for an administrator to view the full graphical output of a user who has a multi-monitor setup having two or more physical display devices (e.g. CRT or LCD display), because the graphical (i.e. video) output of the user's workstation is split among the multiple display devices. This "split display" of the graphical output cannot be readily viewed by the administrator on the administrator's display terminal. Furthermore, each user's workstation may have different display drivers and display settings. This further complicates the problem of monitoring the user from the administrator workstation. A still further complication is that video signals from the various workstation blades are typically received and processed by a rack-mounted management module before being sent to the administrator terminal, and the management module has limited capacity for handling video signals. For example, the management module in many systems is limited to receiving a maximum 1024×768 display resolution, while the various workstation blades have graphics cards and associated hardware capable of much higher digital resolution.

A solution is therefore needed to allow a system administrator to remotely monitor the video output of a selected user workstation. In particular, a monitoring system is needed that would allow the administrator to monitor the workstation of any user regardless of the user display setup, including whether or not the user has a single monitor or multiple monitor display. The system administrator should be able to fully monitor the video from the administrator terminal in the same format as it would be displayed at the associated user terminal. The system administrator should also be able to monitor the video output regardless of the type, size, number, resolution, and other display parameters of the user terminal.

SUMMARY OF THE INVENTION

The present invention includes a system and method to automatically adjust video settings associated with a selected client so that an administrator can view the graphical output (i.e. video output) in the same format as it is displayed at a user terminal associated with the client. These embodiments include methods for automatically and temporarily adjusting a user's video output to a display format that allows the administrator to see the entire display. The video output at the remote user may be temporarily switched from a multiple display output to a single display output. The user display settings may be automatically and temporarily switched to settings that can be transmitted over the network to the administrator and are compatible for properly viewing on the administrator's terminal. Thus, the same video output may be simultaneously displayed at both the remotely located user's terminal and the administrator's terminal.

A first embodiment provides a method of monitoring the video output of network nodes. A first node is instructed to send the video output of the first node to a first networked terminal using a single digital video port of a video card associated with the first node. The first node is also instructed to send the video output of the first node to a second networked terminal from a single analog video port of the video card associated with the first node. The video output sent to the first remote terminal is displayed on a single display of the first remote terminal. The video output sent to the second remote terminal is displayed on a single display of the second remote terminal. For example, the first node may be a workstation blade and the first remote terminal may be a user terminal associated with the workstation blade. The second remote terminal may be an administrator terminal. Thus, for example, a user's dual-display output may be automatically and temporarily switched to a single display output while the administrator is monitoring the user, so that the user and administrator both view the same video output on their respective terminals in a single-display format.

A second embodiment provides a computer program product for implementing the method of the first embodiment. The computer program product may be implemented, for example, on a multi-node computer system, such as a network of workstation blades, wherein each workstation blade is a node, to allow an administrator to selectively monitor the workstation blades. The computer program product includes a computer usable medium with computer usable program code for monitoring video output of network nodes. Computer usable program code is provided for instructing a first node to send video output to a first networked terminal using only one digital video port of a video card associated with the first node, for instructing the first node to send the video output to a second networked terminal from a single analog video port of the video card associated with the first node, for causing the video output sent to the first remote terminal to be displayed on a single display of the first remote terminal, and for causing the video output sent to the second remote terminal to be displayed on a single display of the second remote terminal. The computer program product allows a user's dual-display output to be automatically and temporarily switched to a single display output while the administrator is monitoring the user, so that the user and administrator both view the same video output on their respective terminals in a single-display format.

A third embodiment provides a system including a plurality of networked client-server pairs. Each client-server pair includes a user terminal having at least one user display screen. A management entity includes an administrator terminal networked with the client-server pairs. The management entity is configured for selectively accessing one of the client-server pairs for configuring the associated user terminal according to selected display settings, for receiving graphical output from the selected client-server pair, and for displaying the graphical output on the administrator terminal while the graphical output is simultaneously displayed on the user terminal. For example, the system may automatically and temporarily switch a user's dual-display output to a single display output for viewing at both the user terminal and administrator terminal, using the appropriate display settings that are compatible for viewing at both the user terminal and administrator terminal.

Other embodiments, aspects, and advantages of the invention will be apparent from the following description and the appended claims.

DETAILED DESCRIPTION OF PREFERRED EMBODIMENTS

Figure 1:
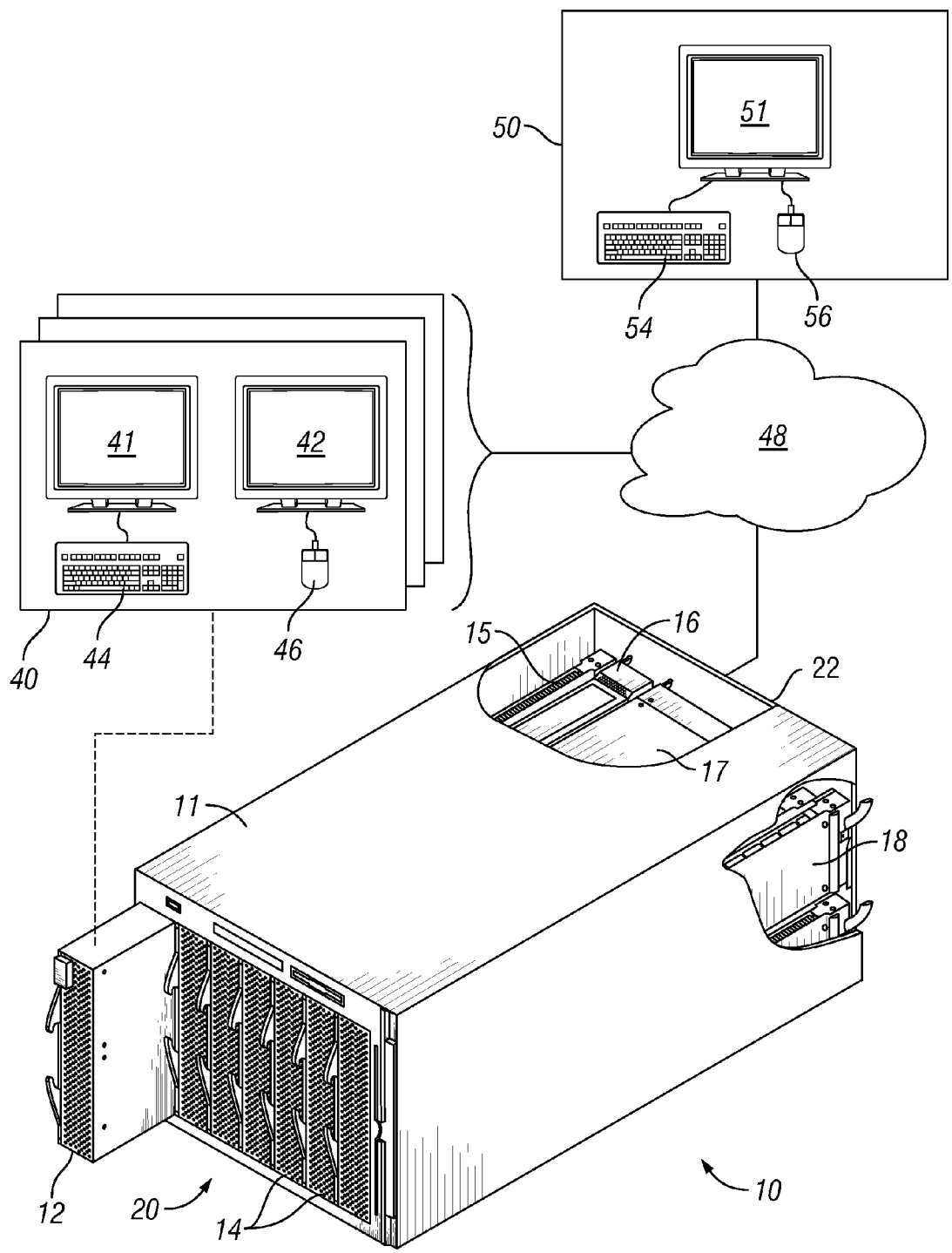
FIG. 1 is a perspective view of a computer system configured for supporting multiple workstation blades in accordance with one embodiment of the invention

The present invention provides a way to automatically adjust video settings associated with a selected client so that an administrator can view the video output in the same format as it is displayed at a user terminal associated with the client. In particular, the present invention may be used to automatically adjust video settings associated with a selected workstation blade so that the administrator can view the video output on an administrator terminal in the same format as it is displayed at a client/user terminal associated with the selected workstation blade. Video output refers not only to moving image video, such as the many video file formats, but also to still image formats, text, and any other graphical output displayable on a display such as an LCD monitor, a CRT, or a plasma screen. The display settings of the workstation blade may be stored, after which the display resolution may be automatically scaled to predefined display settings compatible for viewing at both the administrator terminal and client terminal. A remote client having multiple-display output (e.g. video output configured for display on a client's dual-monitor display) may be automatically switched to a single-display output. This process of adjusting the video output to a format viewable essentially identically on both the remote client and administrator displays may alternatively be referred to herein as "normalizing" the display settings of the administrator and the user.

Common limitations of the graphics card and management module do not accommodate the administrator terminal receiving dual screen output or even a high resolution output to a single screen. Thus, one embodiment provides a way to automatically adjust video settings of a selected workstation blade and its associated user terminal so that the complete video output can be accurately displayed simultaneously at an administrator terminal. The video settings of the selected workstation blade may be automatically adjusted to standard VGA settings, which are the "lowest common denominator" display settings capable of being displayed on just about any user display and administrator display, regardless of the driver associated with the user's graphics card. The video may also be automatically converted to a single-screen display if the user has multiple displays (e.g. a dual-monitor setup), so that the administrator may view the video on a single display at the administrator terminal. Thus, it does not matter whether the administrator has a high-resolution or low-resolution display, or whether the administrator has the same number of displays as the user.

The invention provides a desirable alternative to manually adjusting display settings at the user terminal and/or at the administrator terminal, which saves time and effort, and prevents inadvertently misconfiguring these settings. The invention may also be used to prevent scenarios wherein, for example, part of the video output is "clipped" due to a smaller display being used at the administrator terminal, or wherein part of the video output is not visible to the administrator due to the user having a dual-display output and the administrator having only a single display, or wherein the video output is simply not displayable at all to the administrator. By allowing the administrator to see exactly what the user sees, the administrator is able to more efficiently and reliably maintain and troubleshoot the system.

FIG. 1 is a perspective view of a computer system 10 configured for supporting multiple workstation blades 12 in accordance with one embodiment of the invention. The computer system 10 shown includes a rack-mountable, BladeCenter® style chassis 11, which is one example of a wide variety of options available in the industry for supporting workstation blades. However, the invention does not require the use of IBM products, and may be applied to any of a variety of workstation blade systems and similar systems available on the market. Each workstation blade 12 may include one or more microprocessors, hard drives, and memory to service the client-server network. The computer system 10 includes a variety of shared support modules installed in the chassis 11, including one or more power supply modules 16, one or more blower modules 17, and multiple switch modules 18. A rack-mounted management module 15 is an electronic controller that manages the chassis, workstation blades, and other modules. The management module 15 has an Ethernet point-to-point connection with each of the switch modules 18, and with all other major chassis components. The power modules 16 provide power to the system. The blower modules 17 generate airflow through the chassis 11 to cool the computer system. The switch modules 18 provide network connectivity between the workstation blade I/O and the network. An optional acoustic module (not shown) may be included to reduce noise.

Each workstation blade 12 is associated with a user terminal 40, so that the computer system 10 supports a number of users equal to the number of workstation blades installed in the chassis 11. Each workstation blade 12 houses internal computer components such as processors and heatsinks, DIMMs, one or more hard drives, and adapter cards. Each workstation blade 12 may also include a baseboard management controller (BMC), which is a specialized microcontroller embedded in the motherboard whose functionality includes receiving input from different sensors and sending an alert to the administrator if any parameters do not stay within predefined limits. The workstation blades 12 are installed in the front 20 of the chassis 11 and the support modules 15-18 are installed in the rear 22 of the chassis 11. The workstation blades 12 and support modules 15-18 meet at an internal chassis interface known as the midplane, which provides all of the interconnections among the workstation blades 12, modules, media tray, and DC power distribution throughout the chassis. Connectors at the midplane couple the workstation blades 12 with the support modules 15-18 to reduce wiring requirements and facilitate installation and removal of the workstation blades 12. In the context of client-server networking terminology, each workstation blade 12 is on the server side, and each user terminal 40 is on the client side of a client-server pair formed between the user terminal 40 and the associated workstation blade 12.

Each workstation blade 12 is a network node, and each associated user terminal 40 may also be a network node, with each workstation blade 12 and associated user terminal 40 networked over a network 48. The user terminal 40 enables an individual user to communicate with the associated workstation blade 12 over the network 48 using a combination of input peripherals such as a keyboard 44 and pointing device 46, and one or more output peripheral such as displays 41, 42. Terminals are sometimes divided into three classes based on how much processing power they contain. An "intelligent terminal" describes a stand-alone device that contains main memory and a CPU. A "smart terminal" contains some processing power, but not as much as an intelligent terminal. A "dumb terminal" has no processing capabilities, and relies entirely on the server-side processor. The user terminal 40 provides a familiar computing environment to a user located at the user terminal 40, even though the processor complex and related computing hardware are on the workstation blade 12, which is centrally located at the chassis 11. Additional user terminals also interface with their associated workstation blade 12 over the network 48.

An administrator terminal 50 is also networked with the computer system 11 over the network 48. The administrator terminal 50 is similar in some respects to a user terminal in that it provides a familiar computing environment to a human administrator. Here, the administrator terminal 50 includes administrator input/output peripherals including at least one administrator display 51, along with a keyboard 54 and pointing device 56. The administrator terminal 50 is uniquely configured to allow an administrator to selectively access any of the workstation blades and monitor what is being displayed on the associated user terminals, such at to perform maintenance, troubleshooting, or software installation. For example, when accessing the workstation blade 12 from the administrator terminal 50, the computer system 10 adjusts the displayed output so that what is being displayed on the administrator terminal 50 is the same as what is being displayed on the user terminal 40. More particularly, and as described in further detail below, the system 10 can automatically reduce the video output at the user terminal 40 from a dual-display output on the displays 41, 42 to a single display output on the display 41, and simultaneously display this video on the administrator display 51. The system 10 may also automatically adjust the display settings of the user terminal 40 to a predefined group of settings, such as resolution, refresh rate, and display area that is capable of being displayed on both the single user display 41 and the administrator display 51.

In one embodiment, the predefined group of display settings are a group of settings that can be output by any VGA (Video Graphics Array) output. VGA is an analog computer display standard to which the majority of manufacturers previously conformed. VGA can be output independent of any graphics driver. DVI (Digital Video Interface), by contrast, is a newer video interface standard designed to maximize the visual quality of digital display devices such as flat panel computer displays. VGA settings can be displayed on newer digital display devices, but DVI settings typically cannot be viewed on older analog display devices. VGA settings, therefore, provide the "lowest common denominator" that all client graphics hardware supports before a device-specific driver is loaded onto the computer. Most graphics cards contain one VGA output port and two DVI output ports, and can only output video signals over any two of the three ports (VGA, DVI-1, and DVI-2) at any given moment. VGA settings are convenient and reliable to use in the context of this invention because the user displays 41, 42 and the administrator display(s) 51 are likely to have the ability to display graphical output according to the VGA specification, regardless of their age, type, or video drivers. Also, a management module 72 (discussed below in connection with FIG. 2) conventionally accepts up to a 1024×768 VGA display signal. Thus, converting the video output of a selected workstation blade to VGA-capable settings and providing that video output to both the user terminal and the administrator terminal allows an administrator to view the video on the administrator display 51 in a display format that duplicates the display format as viewed on one of the user displays 41. The invention provides a system and method to automatically perform this conversion to a single-display output using VGA-standard settings. The video output to the user terminal may be in a digital format, whereas the video output to the administrator terminal may be in analog format.

Figure 2:
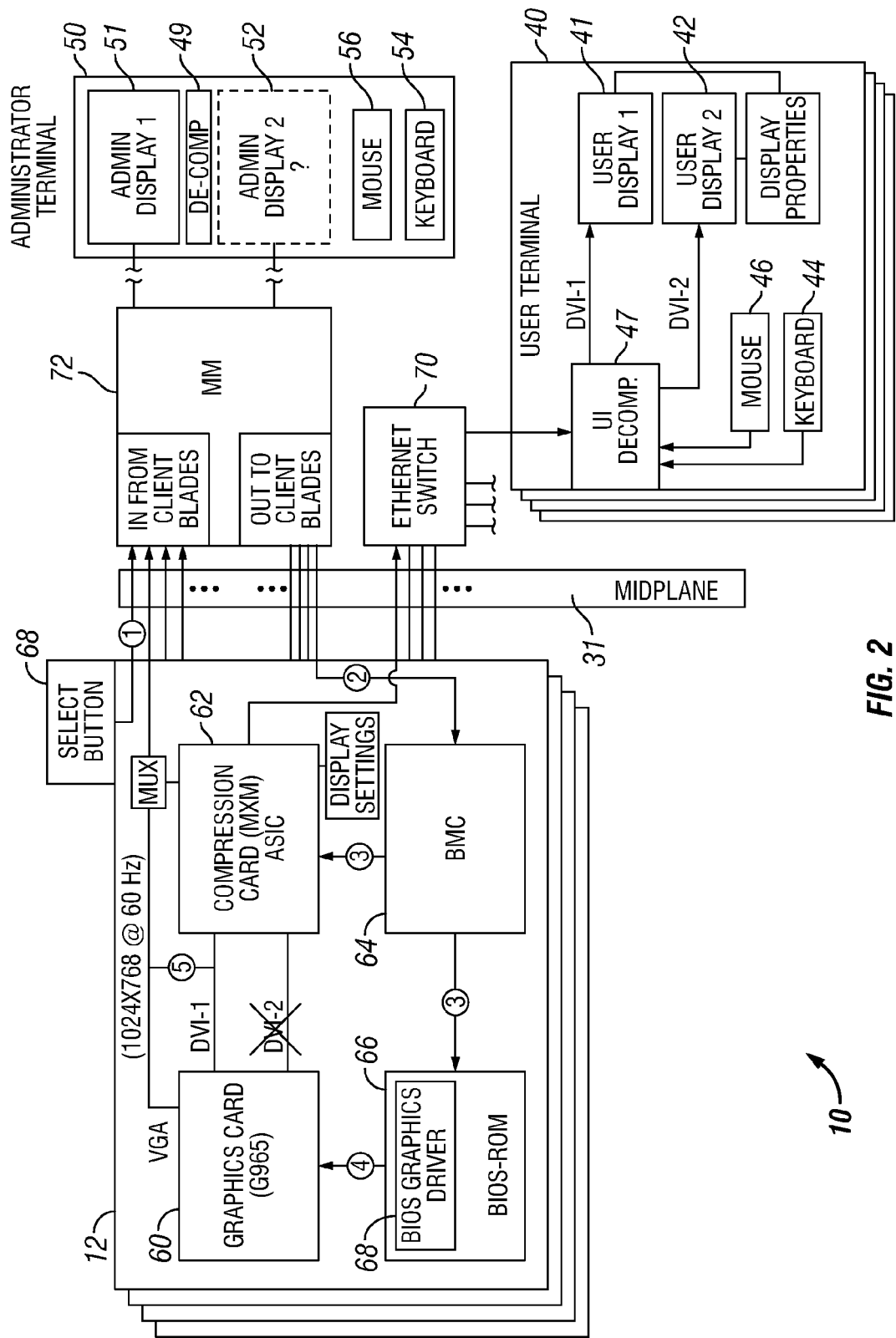
FIG. 2 is a detailed schematic diagram of the computer system configured according to one embodiment of the invention to allow for automatic conversion of a selected workstation blade to single-screen VGA settings and simultaneous output of the video at the converted settings to both the user terminal associated with the selected workstation blade and the administrator terminal.

FIG. 2 is a detailed schematic diagram of the computer system 10 configured according to one embodiment of the invention to allow for automatic conversion of a selected workstation blade 12 to single-screen VGA settings and simultaneous output of the video at the converted settings to both the user terminal 40 associated with the selected workstation blade 12 and the administrator terminal 50. In the context of client-server networking terminology, the user terminal 40 is on the client side of a client-server pair and the workstation blade 12 is on the server side of a client-server pair. The workstation blade 12 in this embodiment includes a graphics card 60, which may include a "G695" chip or an M×M compression card 62, a baseboard management controller (BMC) 64, and a BIOS-ROM 66 containing a BIOS graphics driver 68. The user terminal 40 includes the user displays 41, 42, the keyboard 44, the mouse 46, and a User Interface (UI) decompression module 47. The workstation blade 12 interfaces with the midplane 31, and signals are routed between the workstation blade 12 and the user terminal 40 over an Ethernet switch 70. A management module 72 installed in the chassis supports the workstation blades, providing a single point of control for the workstation blades and other modules.

During normal use, when not being monitored by the administrator terminal 50, the video output may be displayed on the user terminal 40 according to the preferences and settings of the user terminal 40. The graphics card 60 reads the EDID (extended display identification data) provided by the user display(s) 41, 42 to describe their capabilities to the graphics card 60. Video is sent to the user displays 41, 42 based on their respective EDID. In the case of the dual-display setup shown, DVI-1 sends a digital video signal to the first user display 41 while DVI-2 sends a digital video signal to the second user display 42. The graphics driver associated with the graphics card 60 may cause the video output to be split so that DVI-1 essentially sends one half of the viewing area over DVI-1 to display 41 and the other half of the viewing area over DVI-2 to the display 42. The workstation blade 12 takes any high-resolution graphics, compresses the video, packetizes the video into TCP/IP packets and transmits it over the Ethernet local or remote area network using the compression card 62 to the displays 41, 42. The remote client display resolution and other display settings may therefore be varied as desired by the user, as usual.

When the system administrator (i.e. "IT administrator") desires to monitor the workstation blade 12 using the administrator terminal 50, the administrator needs to view all of the video output in a format that can be displayed on the administrator terminal 51. According to the invention, a process is therefore used to automatically adjust the display settings of the workstation blade 12 so that the graphical output is viewable at both the administrator terminal 50 and at the user terminal 40. In this embodiment, this is done by switching the video output to a single display format at both the user terminal 40 and administrator terminal 50 and normalizing the display settings to the lowest common denominator VGA settings.

This process may be described as follows. When an administrator desires to monitor the video output of the workstation blade 12, the administrator first selects the client-server pair consisting of the workstation blade 12 and associated user terminal 40 by pressing the selection button 68. The selection button 68 may physically reside on the workstation blade 12 being selected. While the user terminals may all be remotely located with respect to the computer system 10, the administrator terminal 50 may be located in the same room or same building as the computer system 10, thus placing the selection button 68 within convenient access of the administrator. Alternatively, particularly if the administrator is also remotely located with respect to the computer system 10, a virtual selection button 68 could be provided allowing the administrator to select the workstation blade 12 directly from the administrator terminal 50.

In response to the pressing of the button 68, the management module 72 instructs the BMC 64 to limit the video output to the workstation blade 12 to a single display and a defined resolution. The BMC 64 informs the compression card 62 and the BIOS 68 of the change. Because graphics cards are almost universally limited to outputting video through at most two video outputs simultaneously (e.g. any two of the three outputs VGA, DVI-1, and DVI-2), both outputs DVI-1 and DVI-2 are occupied during dual-display output to the user terminal 40, preventing any video from being transmitted by the VGA output. Now that the administrator terminal 50 needs to receive video, the graphics card 60 needs to switch to outputting video using only one video output to the user terminal 40 and one video output to the administrator terminal 50. Generally, management modules are limited to receiving analog, VGA video at a maximum of 1024×768 resolution. Thus, when the administrator pushes the button 68 or otherwise selects to monitor video specific to the workstation blade 12, the user terminal 40 needs to revert to a single display output so it can simultaneously output video to the administrator terminal 50 using the VGA output. The compression card commands the user terminal 40 to switch to a single display 41. Simultaneously, the BIOS 66 commands the graphics card 60 to switch to a single display output to both the user terminal and the administrator terminal. This results in a forced single-display output of the same content at both the user terminal 40 and the administrator terminal 50, even though one output may be digital and the other output may be analog. The graphics card 60 then "drops" the DVI-2 output but maintains the DVI-1 output. The decompression module 47 at the user terminal 40 decompresses the video signal so that the video may be displayed in a single-screen format on the user terminal 41. The video displayed on the user terminal 40 may still be in a digital format, but is optionally limited to the VGA-capable resolution settings (e.g. 1024×768). The user terminal 40 changes from a dual display on displays 41 and 42 to a single display on the display 41. The graphics card 60 also outputs the video from the VGA output to the management module 72. The management module 72 processes the video, including converting the analog VGA signal to a digital signal and compressing the video, and then passes the processed video through the Ethernet switch 70 to the decompression module 49 at the administrator terminal 50. The decompression module 49 decompresses the signal and displays it at the selected VGA settings on the administrator display 51.

Desirably, the process outlined above takes place automatically in response to selecting a client-server pair. Thus, the administrator need not physically go to the associated user terminal, which may be located remotely, to manually adjust the display settings. Nor does the administrator need to instruct the user to manually convert the settings. Automatically converting the video output to the VGA-compliant settings allows the administrator to view the video output from the selected workstation blade, regardless of the type of administrator display, and regardless of the brand, type, or driver of the graphics card. Automatically converting the video output to the single-screen format allows the administrator to view all of the video output from the workstation blade on the single user display, whether or not the administrator terminal includes an optional second display or merely has one display.

It should be recognized that the invention may take the form of an embodiment containing hardware and/or software elements. Non-limiting examples of software include firmware, resident software, and microcode. More generally, the invention can take the form of a computer program product accessible from a computer-readable medium providing program code for use by or in connection with a computer or any instruction execution system. For the purposes of this description, a computer-usable or computer readable medium can be any apparatus that can contain, store, communicate, propagate or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), and DVD.

A data processing system suitable for storing and/or executing program code typically includes at least one processor coupled directly or indirectly to memory elements. For example, the processors used to execute the program code may reside on or include the management module 72, BMC 64, graphics card 60, compression card 62, or BIOS-ROM 66. The memory elements can include local memory employed during actual execution of the program code, bulk storage, and cache memories that provide temporary storage of at least some program code in order to reduce the number of times code must be retrieved from bulk storage during execution. For example, executable program code or elements thereof may reside on or be communicated between any of the management module 72, graphics card 60 (e.g. in the driver thereof), compression card 62, BIOS-ROM (e.g. in the BIOS graphics driver) 68, or other memory storage elements in communication with these components.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of monitoring the video output of network nodes, comprising:
   selecting a workstation blade to be monitored;
   in response to selecting the workstation blade, automatically switching a video output of the workstation blade from a dual display format to a single display format;
   instructing the workstation blade to send the video output of the workstation blade in the single-display format to a user terminal associated with the workstation blade from one of two digital video ports of a video card associated with the workstation blade;
   instructing the workstation blade to also send the video output of the workstation blade in the singe-display format to an administrator terminal from a single analog video port of the video card associated with the workstation blade;
   displaying the video output sent to the user terminal on a single display of the user terminal; and
   displaying the video output sent to the administrator terminal on a single display of the administrator terminal.

2. The method of claim 1, wherein the workstation blade comprises a selected one of a plurality of rack-mounted workstation blades.

3. The method of claim 2, wherein the administrator terminal is configured for selectively monitoring any of the plurality of rack-mounted workstation blades.

4. The method of claim 1, wherein the steps of instructing the workstation blade to send the video output of the workstation blade in the single-display format to a user terminal associated with the workstation blade from one of two digital video ports of a video card associated with the workstation blade and instructing the workstation blade to also send the video output of the workstation blade in the single-display to an administrator terminal from a single analog video port of the video card associated with the workstation blade are performed automatically in response to pressing a button.

5. The method of claim 1, further comprising:
   in response to selecting the workstation blade automatically changing the display settings of the video output to display settings capable of being output by both the analog video port and by either of the digital video ports.

6. The method of claim 5, further comprising:
   storing the display settings associated with the dual display format prior to changing the display settings of the video output; and
   subsequently restoring the display settings associated with the dual display format to the stored display settings.

7. The method of claim 5, wherein the selected display settings comprise a display resolution of no more than 1024× 768.

8. The method of claim 1, wherein the two digital video ports each comprise a DVI port and the analog video port comprises a VGA port.

9. The method of claim 1, further comprising a client-server network architecture, wherein the workstation blade is on the server side of a client-server pair and the user terminal is on the client side of the client-server pair.

10. A computer program product comprising computer usable program code embodied on a computer usable storage medium for monitoring video output of network nodes, the computer program product including:
    computer usable program code for receiving the selection of a workstation blade to be monitored and, in response, automatically switching a video output of the workstation blade from a dual-display format to a single-display format;
    computer usable program code for instructing the workstation blade to send the video output of the workstation blade in the single-display format to a user terminal associated with the workstation blade from one of two digital video ports of a video card associated with the workstation blade;
    computer usable program code for instructing the workstation blade to also send the video output of the workstation blade in the singe-display format to an administrator terminal from a single analog video port of the video card associated with the workstation blade;
    computer usable program code for displaying the video output sent to the user terminal on a single display of the user terminal;
    computer usable program code for displaying the video output sent to the administrator terminal on a single display of the administrator terminal.

11. The computer program product of claim 10, wherein the workstation blade comprises a selected one of a plurality of rack-mounted workstation blades.

12. The computer program product of claim 11, wherein the administrator terminal is configured for selectively managing any of the plurality of rack-mounted workstation blades.

13. The computer program product of claim 10, further comprising:
   computer usable program code for automatically changing the display settings of the video output to display settings capable of being output by both the analog video port and by either of the digital video ports.

14. The computer program product of claim 13, further comprising computer usable program code for sending the video output to the user terminal according to the changed display settings.

15. The computer program product of claim 13, further comprising:
   computer usable program code for storing the display settings associated with the dual display format prior to changing the display settings of the video output; and
   computer usable program code for subsequently restoring the display settings associated with the dual display format.

* * * * *